United States Patent [19]
Quin

[11] 4,134,045
[45] Jan. 9, 1979

[54] SYSTEM FOR ELECTRICAL INTERCONNECTION AND SWITCHING OF MULTIPLE LIGHTING FIXTURES

[75] Inventor: Murray L. Quin, Overland, Mo.

[73] Assignee: Emerson Electric Co., St. Louis, Mo.

[21] Appl. No.: 867,245

[22] Filed: Jan. 6, 1978

Related U.S. Application Data

[63] Continuation of Ser. No. 692,882, Jun. 4, 1976, abandoned.

[51] Int. Cl.$^2$ .............. H05B 37/00; H05B 39/00; H05B 41/00
[52] U.S. Cl. .................. 315/324; 339/28; 339/29 R
[58] Field of Search .............. 315/137, 312, 313, 317, 315/318, 320, 324, DIG. 5; 240/51.11 R; 339/57, 153, 154, 28, 29 R

[56] References Cited
U.S. PATENT DOCUMENTS
4,001,571  1/1977  Martin .................. 307/157 X

Primary Examiner—Alfred E. Smith
Assistant Examiner—Robert E. Wise
Attorney, Agent, or Firm—Charles E. Markham

[57] ABSTRACT

Prewired lighting fixtures and prewired tap boxes each having an input and output receptacle are electrically interconnected by flexible connecting cables having a plug-in connector at each end. The tap boxes have additional output receptacles for connection of branch circuits and some have output receptacles for connection of plug-in switch drop cables. Three wires, one of which is common, extend throughout the system and provide alternate two-wire circuits to facilitate selective switching, reduction in voltage drop, and economy of material.

10 Claims, 25 Drawing Figures

SYSTEM FOR ELECTRICAL INTERCONNECTION AND SWITCHING OF MULTIPLE LIGHTING FIXTURES

This application is a continuation of my copending application, Ser. No. 692,882, filed June 4, 1976, now abandoned.

This invention relates to systems for the electrical interconnection and switching of multiple lighting fixtures and particularly to a system which provides convenient and low cost interchangeable electrical interconnection and switching of the lighting fixtures.

Currently, illumination of spaces in office buildings and the like frequently takes the form of suspended ceilings comprising a mosaic of illuminating panels or modules each including a lighting fixture with one or more lamps. A typical arrangement of this kind is shown in U.S. Pat. No. 3,372,270. It will be appreciated that the field wiring of large areas involving the great numbers of lighting fixtures included in such arrangements by conventional prescribed methods of electrically interconnecting the fixtures and providing the desired switching arrangements is a very time consuming and high labor cost procedure.

Moreover, subsequent alterations of fixture interconnections and switching arrangements are frequently required as a result of subsequent alterations in the partitioning of the illuminated space to provide offices or suites desired by changing tenants. This again involves high labor cost when accomplished by the usual methods of field wiring.

U.S. Pat. Nos. 3,377,488 to Albert A. Lorenzo and 4,001,571 to Myron D. Martin disclose arrangements for the interchangeable plug-in connection and selective switching of lighting fixtures. However, in the Lorenzo arrangement, the connection or disconnection of circuit leads within the lighting fixture is required to effect a switching change, and in the Martin arrangement, the stacking of multiple plug-in connectors required to interconnect the fixtures and particularly to effect a switching change results in substantially increased voltage drop.

It is an object therefore of this invention to provide a generally new and improved system and the required components for the safe, economical, and conveniently interchangeable electrical interconnection and switching of multiple lighting fixtures.

A further object is to provide a conveniently interchangeable electrical interconnect and switching system for multiple lighting fixtures wherein prewired lighting fixtures and prewired branch and switch tap boxes each having input and output receptacles are interconnected by lengths of flexible cable having plug-in connectors at each end.

A further object is to provide an electrical interconnect and switching system for multiple lighting fixtures, as in the preceding paragraph, in which three circuit leads, one of which is common to the other two, extend throughout the system and provide alternate two-wire circuits to facilitate selective switching and reduce voltage drop.

A further object is to provide an electrical interconnect system for multiple lighting fixtures, as in the preceding paragraph, which will promote energy conservation by providing an economical and convenient means for relocation and switching of lighting fixtures when illumination requirements change within offices or areas of buildings.

Further objects and advantages will appear from the following description when read in connection with the accompanying drawings.

In the drawings:

FIG. 3 is an enlarged elevational view, with parts broken away, showing a plug-in connector attached to an end of the connecting cable shown in FIG. 1;

FIG. 4 is a front elevational view of a receptacle shown mounted in a fragmentary portion of the wall of a lighting fixture, a branch tap box, a switch tap box or a power distribution box;

FIG. 5 is a cross-sectional view of the receptacle shown in FIG. 4, taken along line 5—5 of FIG. 4;

FIGS. 6 and 7 are side and front elevational views, respectively, of an output terminal block;

FIGS. 8 and 9 are side and front elevational views, respectively, of an input terminal block;

FIG. 10 is a front elevational view of the plug-in connector shown in FIG. 3 and is taken along line 10—10 of FIG. 3;

Figures 1, 2:
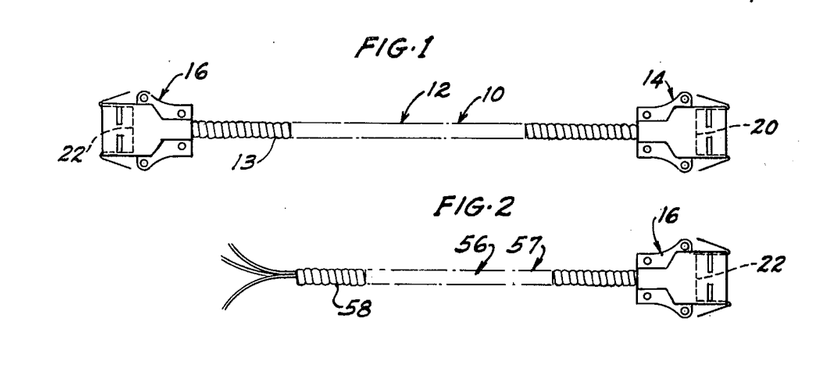
FIG. 1 is a side elevational view of a flexible connecting cable constructed in accordance with the present invention.
FIG. 2 is a side elevational view of a switch drop cable constructed in accordance with the invention.

Referring to the drawings in more detail, straight-through and reversing type flexible connecting cables 10 and 12, respectively, are shown in FIG. 1. Connector cables 10 and 12 are similar except for a difference in the arrangement of lead connections to be described. Both connecting cables 10 and 12 comprise a length of flexible metal conduit 13 with an output plug-in connector 14 at one end and an input plug-in connector 16 at the other end. Both plug-in connectors 14 and 16 are formed of two half portions 15 joined by rivets 18, see FIG. 3. The end portions of flexible conduit 13 enter the rear ends of the connectors 14 and 16 and are rigidly clamped between the two half portions 15. Plug-in connector 14, shown in FIG. 3, is provided with an output terminal block 20, shown in FIGS. 6 and 7, whereas plug-in connector 16 is provided with an input terminal block 22, shown in FIGS. 8 and 9. Otherwise the plug-in connectors 14 and 16 at the ends of connector cables 10 and 12 are identical.

Both output and input terminal blocks 20 and 22 are of generally rectangular shape and are constructed of a suitable dielectric material. Terminal blocks 20 and 22 are clamped between the two half portions 15 of the plug-in connector and both have rectangular flange portions 25 which extend outwardly through slots 26 in opposite walls of the plug-in connectors, thereby to securely hold them in position.

The output terminal block 20, shown in FIGS. 6 and 7, is provided with a series of four spaced prongs 24 of rectangular cross section and a key prong 26 of T form in cross section. A passageway 28 extends through each prong 24 and continues on through the terminal block, and a spring-pressed connector terminal 30 is positioned in each passageway 28, see FIG. 3. These connector terminals are designated 1, 2, N, and G.

An input terminal block 22, shown in FIGS. 8 and 9, is provided with four rectangular passages 32 extending through the terminal block for receiving the prongs 24 of an output terminal block 20 and a T-shaped slot 31 for receiving the T-shaped prong of a terminal block 20. Each of the four passages 32 extending through the input terminal block 22 has a spring pressed connector terminal 34 therein for engagement with a terminal connector 30 in an output terminal block 20, see FIGS. 3 and 5. Connector terminals 34 are also designated 1-2-N and G in terminal blocks 22.

There are also two kinds of receptacles arranged to receive plug-in connectors 14 and 16. One kind of receptacle 36, referred to hereinafter as an input receptacle and shown in FIGS. 4 and 5, is provided with an input terminal block 22 and is arranged to receive an output plug-in connector 14 at one end of a connecting cable. The other type of receptacle 38, referred to hereinafter as an output receptacle (not shown) and otherwise similar to receptacle 36, is provided with an output terminal block 20 and is arranged to receive an input plug-in connector 16 at one end of the connecting cable.

Referring to FIGS. 4 and 5, both kinds of receptacles 36 and 38 comprise a flanged rectangular metal pan 40 mounted on the inside surface of a wall 41 of a lighting fixture, a branch tap box, or a switch tap box, or a power distribution box by rivets 42. The pan 40 has a rectangular aperture 44 in the bottom thereof which receives the reduced rectangular rear portion 46 of a terminal block 20 or 22 extending beyond the flange portions 25. A terminal block is rigidly fixed in the pan 40 by staking or extruding portions of the pan wall overlying the flanged portions 25 as indicated at 48 in FIG. 4. There is a rectangular aperture 50 in the wall 41 somewhat larger than a terminal block and somewhat smaller than the open end of the pan 40.

When a plug-in connector is entered into a receptacle, the prongs 24 of an output terminal block 20 enter the passages 32 of an input terminal block 22 and the terminal connectors 30 and 34, which are spring pressed in opposite directions, engage to provide electrical connection. The plug-in connectors 14 and 16 are provided with resilient latching elements 52 with abutment surfaces 54 formed thereon. As the resilient elements 52 are flexed inward upon entering a plug-in connector into a receptacle, the abutment surfaces 54 thereon engage the inner surface of wall 41 adjacent the aperture 50 to latch the plug-in connector to the receptacle. The resilient latching elements 52 are of sufficient length so as to extend outwardly of the wall 41 when the plug-in connector is entered and latched so that the abutment surface 54 may be conveniently released by further flexing of the elements 52.

Each of the connecting cables 10 and 12 carry three circuit leads and a ground lead. In a straight-through type connector cable 10, the four leads connect like terminals of plug-in connectors at both ends of the connector cable. Current carrying conductors are herein referred to as circuit leads. In a reversing type connecting cable 12, two of the three circuits leads connect terminals 1 and 2 of the plug-in connector at one end of the connector cable to terminals 2 and 1, respectively, of the plug-in connector at the other end of the cable. In other words, the circuit leads connecting terminals 1 and 2 are crossed.

Flexible switch drop cables 56 and 57 are shown in FIG. 2. These cables each comprise a length of flexible conduit 58 with an input plug-in connector 16 at one end only. Switch drop cables 56 and 57 are similar except that cable 56 carries two circuit leads and a ground lead and cable 57 carries three circuit leads and a ground lead. Switch drop cables 56 and 57 are adapted for use with specifically prewired switch boxes as will be described hereinafter.

It will be noted that passageways 28 through the prongs 24 of input terminal blocks 20 are considerably smaller than the passageways 32 of output terminal blocks 22 and that the terminals 30 are recessed to a greater extent in terminal blocks 20 than are the terminals 34 of terminal blocks 22, see FIGS. 3 and 5. A greater measure of safety is achieved in this arrangement over an arrangement in which the plug-in connectors at both ends of the connecting cables are provided with output terminal blocks 20 and all receptacles with input terminal blocks 22.

FIGS. 11 to 17 diagrammatically illustrate the prewiring arrangements of four different switch tap boxes, 60, 62, 64, and 66, a branch tap box 68, a lighting fixture 70, and a power distribution box 72.

Figure 11:
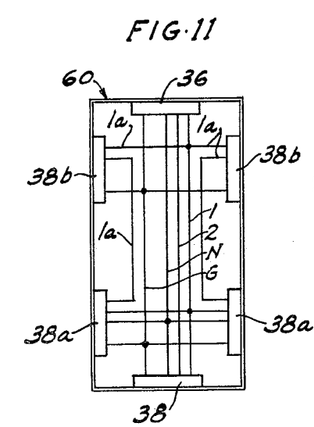
FIG. 11 is a diagrammatic view of a Type A prewired switch tap box.

A prewired switch tap box 60, FIG. 11, is employed to interconnect and separately switch two runs of lighting fixtures which may extend into separate rooms or areas. Switch tap box 60 is provided with an input receptacle 36 at one end and an output receptacle 38 at the other end. Three circuit leads and a ground lead extend through the box and connect like terminals 1, 2, N, and G of receptacles 36 and 38. Box 60 is further provided with two lower lateral output receptacles 38a further provided with two lower lateral output receptacles 38a for the connection of two runs of lighting fixtures and two upper lateral output receptacles 38b for the connection of two single pole, single throw switches 82 through two switch drop cables 56, see arrangement "A" in FIG. 25.

Figure 12:
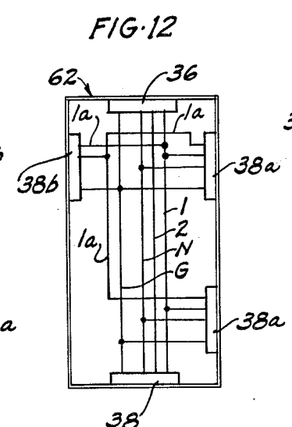
FIG. 12 is a diagrammatic view of a Type B prewired switch tap box.

A prewired switch tap box 62, shown in FIG. 12, is employed to interconnect and jointly switch one or two runs of lighting fixtures. Switch tap box 62 is provided with an input receptacle 36 at one end and an output receptacle 38 at the opposite end. Three circuit leads and a ground lead extend through the box and connect like terminals 1, 2, N, and G of receptacles 36 and 38. Box 62 further includes two lateral output receptacles 38a for the connection of two runs of lighting fixtures and a lateral output receptacle 38b for the connection of a single pole, single throw switch 82 through a switch drop cable 56, see arrangement "B" in FIG. 25.

Figure 13:
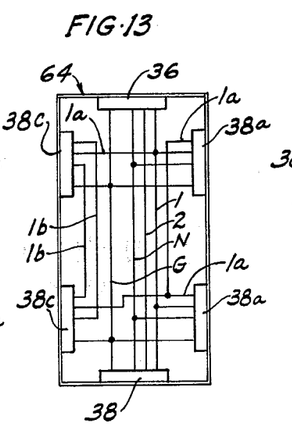
FIG. 13 is a diagrammatic view of a Type C prewired switch tap box.

A prewired switch tap box 64, shown in FIG. 13, is employed to interconnect one or two runs of lighting fixtures and to switch them from remote points. Switch tap box 64 is provided with an input receptacle 36 at one end and an output receptacle 38 at the other end. Three circuit leads and a ground lead extend through the box and connect like terminals 1, 2, N, and G of receptacles 36 and 38. Box 64 further includes two lateral output receptacles 38a for the connection of two runs of lighting fixtures and two lateral output receptacles 38c for the connection of two double throw, single pole switches 84 through two switch drop connector cables 57, see arrangement "C" in FIG. 25.

Figure 14:
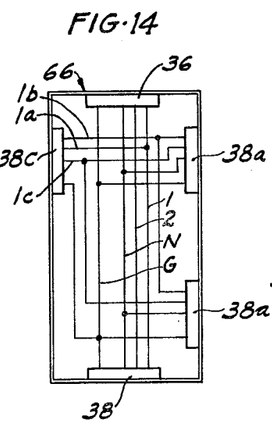
FIG. 14 is a diagrammatic view of a Type D prewired switch tap box.

A prewired switch tap box 66, shown in FIG. 14, is employed in connection with reversing connector cables 12 to interconnect one or two runs of lighting fixtures with a power source and to selectively switch alternate fixtures or groups of fixtures in each run. Switch tap box 66 is provided with an input receptacle 36 at one end and an output receptacle 38 at the other end. Three circuit leads and a ground lead extend through the box and connect like terminals 1, 2, N, and G of receptacles 36 and 38. Switch box 66 is further provided with two lateral output receptacles 38a for the connection of runs of lighting fixtures through connecting cables 10 and 12 and a lateral output receptacle 38d for connection of two single pole, single throw switches through a switch drop cable 57, see arrangement "D" in FIG. 25.

Figure 15:
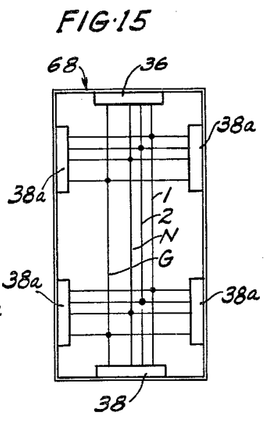
FIG. 15 is a diagrammatic view of a prewired branch circuit tap box.

A prewired branch tap box 68, shown in FIG. 15, is employed to interconnect several branch runs of lighting fixtures with a power source. Branch tap box 68 is provided with an input receptacle 36 at one end and output receptacle 38 at the other end. Three circuit leads and a ground lead extend through the box and connect like terminals 1, 2, N, and G of receptacles 36 and 38. Branch tap box 68 is further provided with four lateral output receptacles 38a for connection of one to four runs of lighting fixtures. The terminals 1 and 2 of the four lateral output receptacles 38a are connected, respectively, to through leads 1 and 2.

Figure 16:
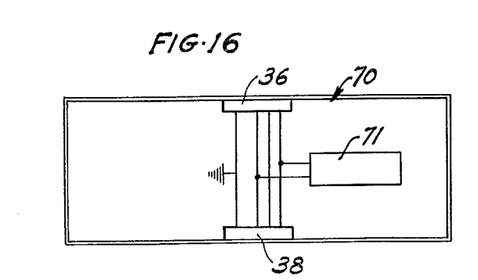
FIG. 16 is a diagrammatic view of a prewired lighting fixture.

A prewired lighting fixture 70, shown in FIG. 16, is provided with an input receptacle 36 and an output receptacle 38. Three circuit leads and a ground lead extend through the fixture and connect like terminals 1, 2, N, and G of input and output receptacles 36 and 38. Lighting fixture 70 further includes one or more lamps 71 connected across the two circuit leads connecting terminals 1 and N. The lamps 71 may be incandescent lamps or they may be electron discharge lamps in which case they include ballast means connected across the two circuit leads connecting terminals 1 and N.

Figure 17:
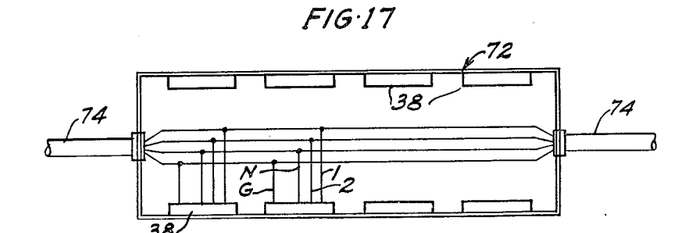
FIG. 17 is a diagrammatic view of a prewired power distribution box.

Distribution box 72, shown in FIG. 17, is provided with knock-outs at each end for conventional connection of conduit means 74 which carries supply leads for the distribution of power. Box 72 is further provided with a plurality of output receptacles 38 for the connection of branch circuits through connector cables 10 or 12. Terminals 1 and 2 of receptacles 38 are connected to one side of a power source and terminal N to the other side thereof through supply leads extending through the distribution box.

Figure 23:
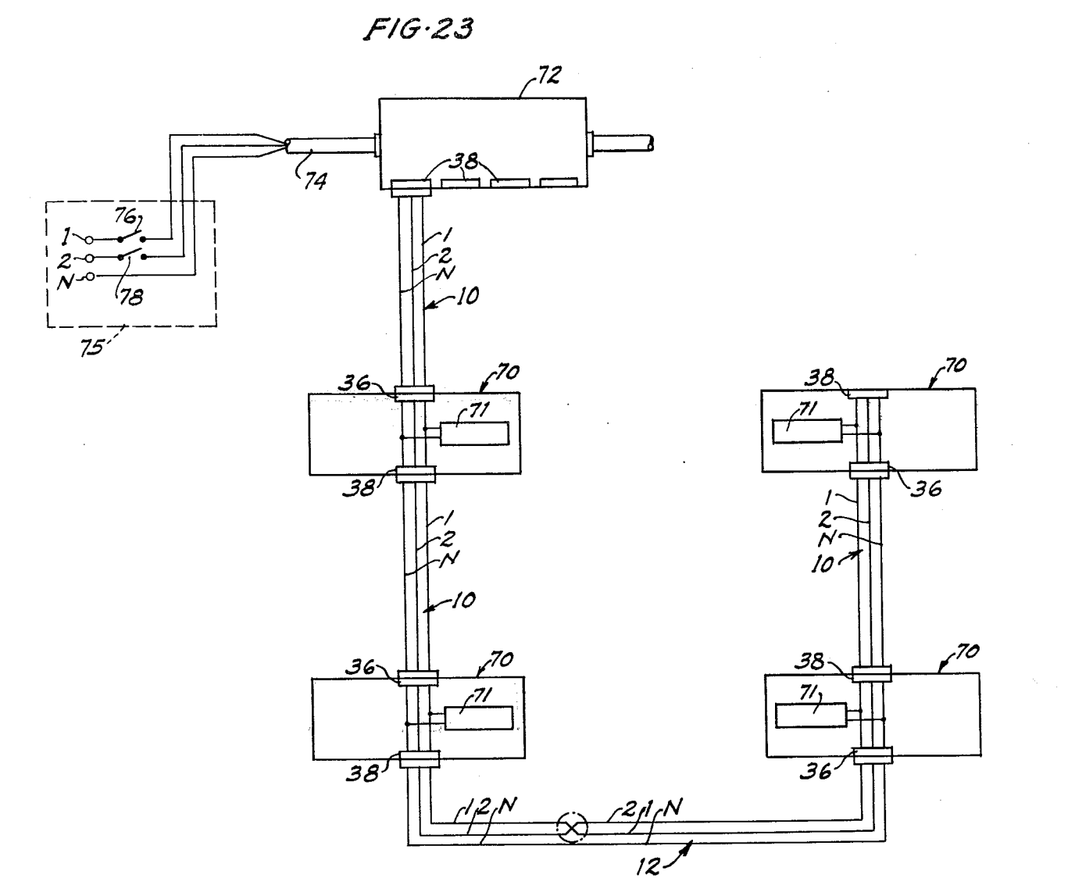
FIG. 23 diagrammatically illustrates an arrangement in accordance with the present invention in which three leads extend throughout to provide two circuits and in which part of a run of prewired lighting fixtures interconnected by flexible plug-in connecting cables is connected to a power source through one circuit and another part of the run through the other circuit by employment of straight-through and reversing type connecting cables.

FIG. 23 diagrammatically illustrates an arrangement in which two portions of a run of tandem connected lighting fixtures are connected to a power source through two different circuits formed by three circuit leads and are independently switched at a panel board. Power source terminals on a terminal board 75, designated 1 and 2, may be connected to two phases of a multiphase power supply or they may be two parallel legs of one side of a single phase supply. In either case, a terminal marked N on panel board 75 is connected to the other side of the power source and is common to both terminals 1 and 2. Lighting fixtures 70 are interconnected by connecting cables 10 and 12 to the panel board 75 through a distribution box 72 and conduit 74.

Three circuit leads extend from the power source terminals 1, 2, and N through the distribution box, the connecting cables, and lighting fixtures. A ground lead G, usually included, is omitted for simplicity. Circuit leads connected to power source terminals 1 and N form a first circuit switched by a switch 76 on panel board 75, and leads connected to terminals 2 and N form a second circuit switched by a switch 78. For convenience, the circuit leads normally connecting like terminals 1, 2, and N are also designated 1, 2, and N.

The first lighting fixture 70 of the run is connected to distribution box 72 by a straight-through connecting cable 10 and the first and second fixtures of the run are interconnected by a connector cable 10. The lamps 71 in the first and second fixtures are therefore connected across the circuit formed by the circuit leads connected to power source terminals 1 and N and are switched by switch 76. The second and third fixtures of the run are, however, interconnected by a reversing connecting cable 12 while the third and fourth fixtures are interconnected by a straight-through connecting cable 10. Inasmuch as all lamps in prewired lighting fixtures 70 are connected across internal circuits leads connecting receptacle terminals 1 and N and inasmuch as the circuit leads connecting plug-in connector terminals 1 and 2 are crossed in reversing connecting cables 12, the lamps in the third and fourth fixtures will be connected across the circuit formed by the circuit leads connected to power source terminals 2 and N and will be switched by switch 78.

By employing three circuit leads to form two circuits and employing a reversing connecting cable 12 to connect part of a run of prewired lighting fixtures through one circuit and part through the other, the lamps in each circuit may be selectively switched. Also, the load carried by each of the three circuit leads is substantially reduced when part of a long run of tandem connected lighting fixtures is connected through one circuit and part through the other when these two circuits are out of phase. Further, by employing three circuit leads to provide two circuits and providing straight-through and reversing type connecting cables 10 and 12, all of the lighting fixtures may be prewired identically; that is, with input receptacles 36 and output receptacles 38 having like terminals 1, 2, N, and G connected by internal circuit leads and with the lamps connected across the circuit leads connecting terminals 1 and N. It is a salient feature of this invention to minimize the number of types of components required for the various interconnect and switching arrangements desired and to construct these components so that they may be interchangeably employed in various arrangements, some of which arrangements are illustrated, by way of example, in FIGS. 23, 24, and 25.

Figure 25:
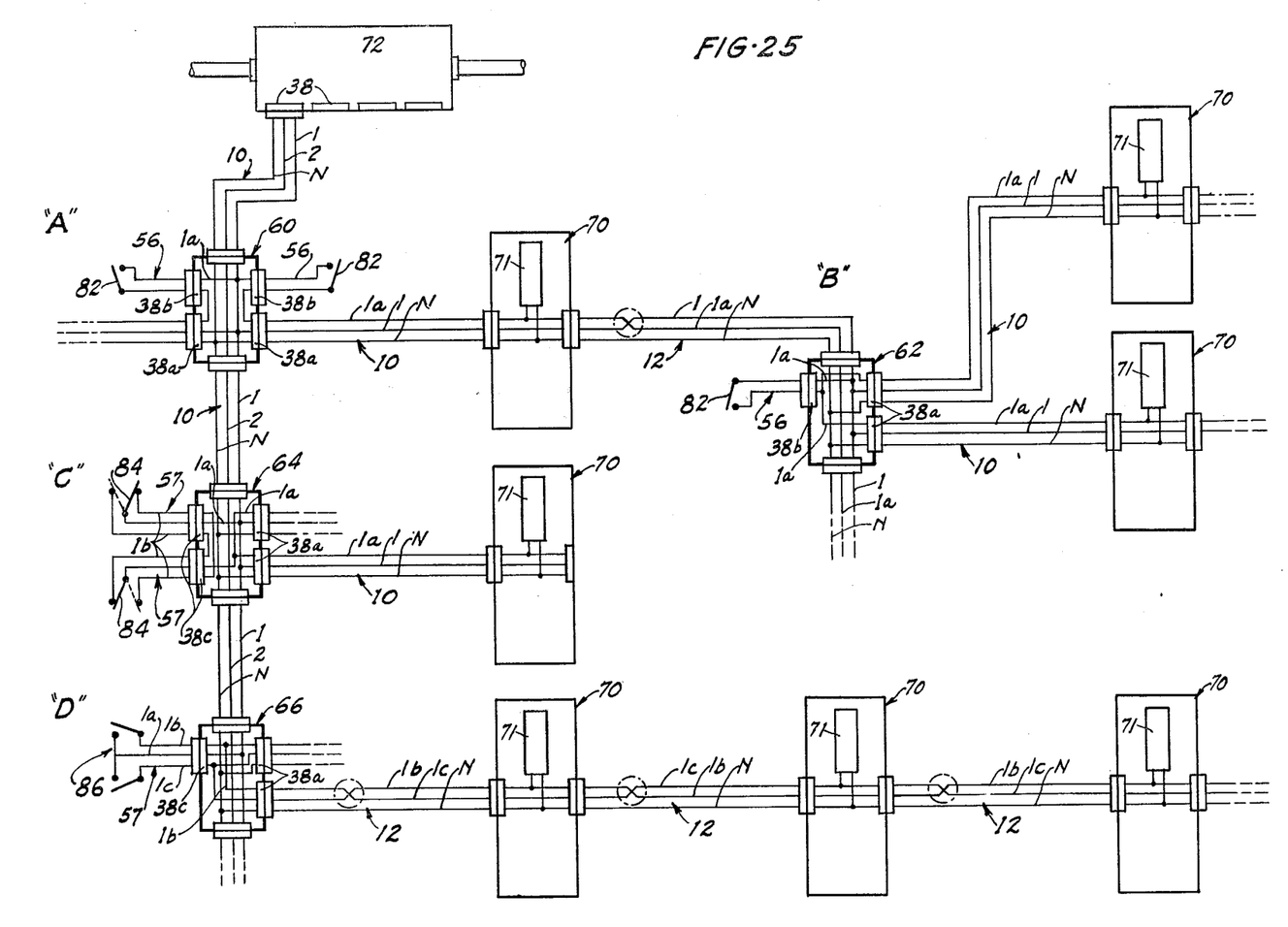
FIG. 25 diagrammatically illustrates a composite of four switching arrangements in which four different prewired switch tap boxes are employed to accomplish single room, two room, three-way and alternate fixture switching.

If, for example, four leads were employed in the arrangement shown in FIG. 23 to provide the desired selective switching with an equivalent economy of wire, then one half of the connector cables and one half of the lighting fixtures would carry four wires and the other half two wires, therefore requiring two kinds of prewired lighting fixtures. Also, if four circuit leads were employed to provide two circuits, it would be necessary to continue the four leads beyond a first change-over from one circuit to another in order to provide for any subsequent change-overs in other arrangements, such as shown in FIG. 25 which will be described hereinafter. To continue the four leads throughout long runs to meet these requirements would clearly require more wire.

Figure 24:
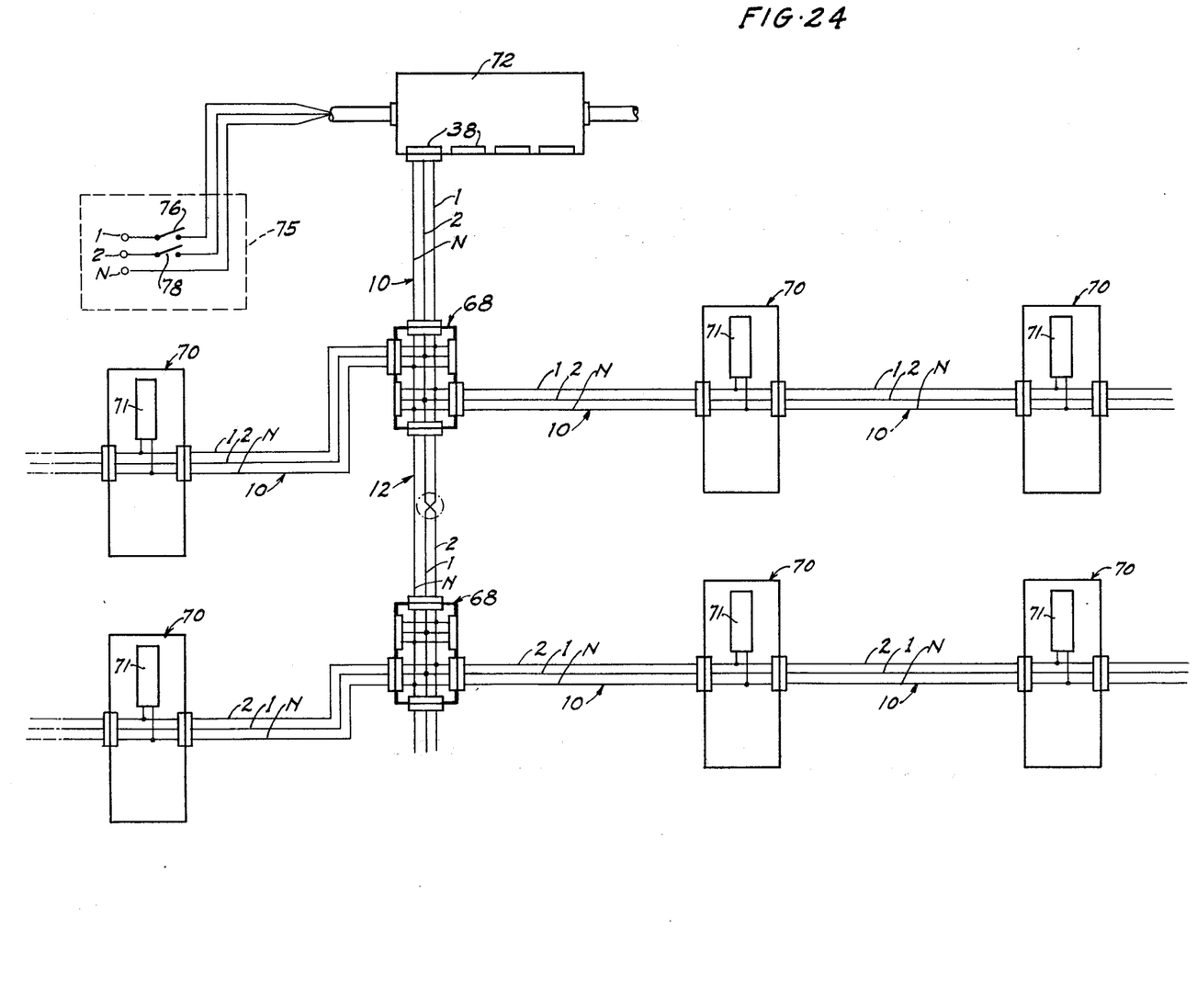
FIG. 24 diagrammatically illustrates a second arrangement in which prewired branch tap boxes interconnected by plug-in connecting cables connect branch runs of lighting fixtures to a power source through one or the other of two circuits formed by three leads extending through the connecting cables and branch tap boxes.

FIG. 24 diagrammatically illustrates an arrangement in which one to four branch runs of lighting fixtures 70 interconnected by connecting cables may be connected to prewired branch tap boxes 68, which boxes are, in turn, tandem interconnected by connecting cables 10 and 12 and connected to the panel board 75 through a distribution box 72. In this arrangement, the first branch tap box 68 is connected to the distribution box 72 through a straight-through type connector cable 10 and thence to the panel board 75. The lamps of all branch runs of fixtures connected to the first branch tap box 68 are therefore connected to power source terminals 1 and N through circuit leads 1 and N and are switched by switch 76. The first and second branch tap boxes 68 are, however, connected by a reversing type connector cable 12 and therefore all branch runs of fixtures connected to the second branch tap box 68 are connected to power source terminals 2 and N through circuit leads 2 and N and will be switched by switch 78. All branch tap boxes 68 are identically prewired, as shown in FIG. 15. Ground lead G is omitted in FIG. 24 for simplicity.

FIG. 25 diagrammatically illustrates a composite of arrangements A, B, C, and D, in which the four different prewired switch tap boxes 60, 62, 64, and 66, designated A, B, C, and D, respectively, and switch drop cables 56 and 57 are employed. Any of the four switch tap boxes may be employed singularly or jointly with any of the others in other desired arrangements.

In arrangement A, providing for two-room switching, a prewired switch tap box 60 is connected to power source terminals 1, 2, and N through a connector cable 10 and a distribution box 72. A circuit lead 1a in the switch tap box 60 connects the through lead 1 to terminals 1 of the upper left and right-hand lateral output receptacles 38b. Lead 1a then extends from terminals 1 of the left and right-hand output receptacles 38b through switch drop cables 56 to one side of the left and right-hand switches 82 and from the other side of these switches 82 back through switch drop cables 56 to terminals 2 of respective receptacles 38b. From terminals 2 of receptacles 38b, the leads 1a extend to terminals 1 of respective left and right-hand lower lateral output receptacles 38a. Terminals 2 of receptacles 38a are also connected to through lead 1 and terminals 3 of receptacles 38a are connected to the through lead N.

It will be seen from the foregoing that runs of interconnected lighting fixtures connected to the left-hand output receptacle 38a will be switched by the left-hand switch 82, and those runs connected to the right-hand output receptacle 38a will be switched by the right-hand switch 82. It will also be noted that receptacles 38a have connected thereto a switched lead 1a and an unswitched lead 1 in addition to lead N but do not have the through lead 2 connected thereto. Connecting cables connected to output receptacles 38a will therefore carry a switched lead 1a, an unswitched lead 1, and a lead N.

In arrangement B of FIG. 25, providing for single room switching, a prewired switch tap box 62 is connected to an output receptacle 38a of switch tap box 60 through a straight-through type connecting cable 10, a lighting fixture 70, and a reversing type connecting cable 12. The reversing connecting cable 12 reverses the unswitched lead 1 from terminal 2 in output receptacle 38a of switch tap box 60 to terminal 1 in the input receptacle 36 of switch tap box 62. Therefore, the terminals 1, 2, and N of input and output receptacles 36 and 38 of switch tap box 62 will be connected to the circuit leads 1 (unswitched), 1a (switched), and N in that order extending from output receptacle 38a of switch tap box 60.

A circuit lead 1a in switch tap box 62 connects the through lead 1 to terminal 1 of the lateral output receptacle 38a. Lead 1a then extends from terminal 1 of output receptacle 38b through a switch drop cable 56 to one side of a switch 82 and from the other side of switch 82 back through switch drop cable 56 to terminal 2 of receptacle 38b. From terminal 2 of receptacle 38b, the lead 1a extends to terminals 1 of lateral output receptacles 38a. Runs of interconnected lighting fixtures connected to output receptacles 38a of switch tap box 62 will therefore all be switched by the single switch 82. Only lead 1a extending from switch tap box 60 through the connecting cables 10 and 12 to switch box 62 has been switched. Unswitched lead 1 may be continued from the output receptacle 38 of switch tap box 62 through a straight-through connecting cable 10 to interconnect with other switch tap boxes. In other arrangements, the input receptacle 36 of switch tap box 62 may be connected to the output receptacle 38 of a distribution box 72 or the output receptacle 38 of a branch tap box or other switch tap box by connecting cables 10 or 12.

In the arrangement C of FIG. 25, a switch tap box 64 is prewired for connection of two switches 84 positioned remote from each other so that one or two interconnected runs of lighting fixtures connected to output receptacles 38a of the box 64 may be switched from remote points. The terminals 1, 2 and N of input receptacle 36 of switch box 64 are connected to terminals 1, 2, and N of the power supply through the switch tap box 60, the distribution box 72, and connector cables 10. Leads 1, 2, and N are carried through switch tap box 64 to its output receptacle 38.

Circuit leads 1a in switch tap box 64 connect the through lead 1 to terminal 2 of upper receptacle 38c and connect terminal 2 of lower receptacle 38c with terminals 1 of upper and lower output terminals 38a. Leads 1a are carried from terminals 2 of upper and lower output receptacles 38c to the double throw blades of two switches 84 through switch drop connector cables 57. A pair of leads circuit 1b connected to the two opposite poles of each of the switches 84 are carried back through the switch drop cables 57 to terminals 1 and 3 of the upper and lower receptacles 38c. Terminal 1 of upper receptacle 38c is connected to terminal 3 of lower receptacle 38c and terminal 3 of upper receptacle 38c is connected to terminal 1 of lower receptacle 38c by internal extension of leads 1b. Terminals 2 of output receptacles 38a in switch box 64 are also connected to through lead 1 and terminals 3 of receptacles 38a are connected to through lead N. When either of the switch blades of switches 84 is moved to its dotted line position, fixtures connected to either output receptacles 38a will be switched on. When both switch blades are in the positions shown or when both are in dotted line position, the fixtures will be switched off. Connecting cables connected to output terminals 38a of switch tap box 64 therefore carry an unswitched branch of through lead 1 and a switched branch. Through leads 1 and 2 extend unswitched through switch tap box 64.

In arrangement D of FIG. 25, a switch tap box 66 is prewired for connection of a switch 86 and employed in combination with reversing connector cables 12 to provide for the selective switching of alternate lighting fixtures in one or two interconnected runs of lighting fixtures connected to output receptacles 38a of the switch tap box 66. The input receptacle 36 of switch tap box 66 is connected to terminals 1, 2, and N of the power supply through the switch boxes 64 and 60 and distribution box 72 by connecting cables 10. The leads 1, 2, and N are carried through switch tap box 66 from its input receptacle 36 to its output receptacle 38.

A circuit lead 1a in switch tap box 66 connects the through lead 1 with terminal 2 of an output receptacle 38c. Lead 1a is then carried from terminal 2 of output terminal 38c to the common double faced stationary contact of a switch 86 through a switch drop cable 57. A circuit lead 1b connected to an upper switch blade of switch 86 is carried back to terminal 1 of output receptacle 38c through cable 57 and thence to terminals 1 of output receptacles 38a. A circuit lead 1c connected to a lower switch blade of switch 86 is carried through cable 57 to terminal 3 of the output receptacle 38c and thence to terminals 2 of output receptacles 38a. Terminals 3 of output receptacles 38a are also connected to the through lead N.

The output receptacles 38a of switch tap box 66 therefore have leads 1b, 1c, and N connected to their terminals in that order. Lead 1b is switched by the upper switch blade and the common stationary contact of switch 86, and lead 1c is switched by the lower switch blade and common stationary contact. When runs of lighting fixtures interconnected by reversing cables 12 are connected to output receptacles 38a of switch tap box 64 as indicated, alternate fixtures in each run may be switched by either the upper or lower blades of switch 86 or all may be switched by closing or opening both blades. Through leads 1 and 2 extend unswitched through the switch tap box 66. Other arrangements than those illustrated in FIGS. 23 to 25, employing the described components, will occur to those familar with the art.

Figure 18:
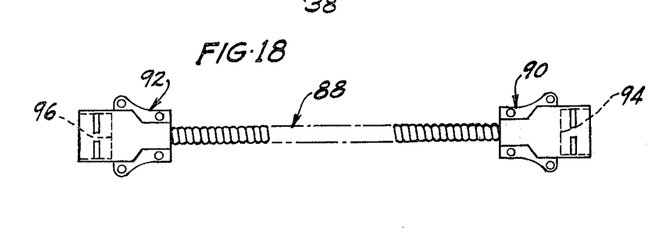
FIG. 18 is a side elevational view of an alternate type of flexible connecting cable equipped with reversible terminal blocks.
Figure 19:
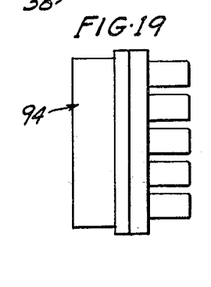
FIGS. 19 and 20 are side and front elevational views, respectively, of a reversible input terminal block.
Figures 20, 21:
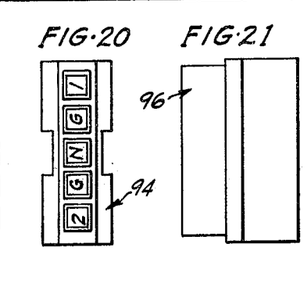
FIGS. 21 and 22 are side and front elevational views, respectively, of a reversible output terminal block.
Figure 22:
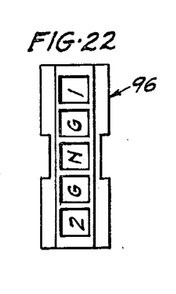

As an alternative to providing straight-through type and reversing type flexible connecting cables 10 and 12 to selectively interconnect the lighting fixtures through one or the other of the two circuits provided with the three circuit leads 1, 2, and N, a single type connecting cable having invertible plug-in connectors at its ends may be employed. In this modification a flexible connecting cable 88, shown in FIG. 18, is provided with an output plug-in connector 90 at one end and an input plug-in connector 92 at the other end. Output plug-in connector 90 is provided with an output terminal block 94, shown in FIGS. 19 and 20, and input plug-in connector 92 is provided with an input terminal block 96, shown in FIGS. 21 and 22.

Also, in this modification, the input receptacles 36 of prewired lighting fixtures and branch and switch tap boxes are provided with input terminal blocks 96 and the output receptacles 38 of these components and of distribution boxes are provided with output terminal blocks 94. Terminal blocks 94 and 96 are provided with five terminals designated 1, G, N, G and 2 and arranged in that order. Three circuit leads and one ground lead extend through the connecting cable 88 and connect the three terminals 1, N, and 2 and one of the terminals G of the terminal blocks 94 and 96 in the plug-in connectors at its ends.

The five terminals 1, G, N, G, and 2 in the terminal blocks of input and output receptacles 36 and 38 of prewired lighting fixtures and branch and switch tap boxes are connected in each case by three circuit leads and two ground leads which extend through these components. Further, in this modification, the connector terminals 30 in the terminal blocks 94 are male terminals engageable with female terminals 34 in the terminal block 96. It will be seen that in this arrangement the inverting of a plug-in connector at one end of a connecting cable 88 will connect terminal 1 of an output receptacle with terminal 1 of an input receptacle and terminal 2 of the output receptacle with terminal 2 of the input receptacle.

Other terminal arrangements than the described arrangement which will provide the desired switch-over from one of the two circuits to the other by inverting a plug-in connector at one end of a connecting cable may be employed. For example, the arrangement 1, G, N, G, and 2 or G, L, N, 2, and G provides an invertible arrangement in which only three circuit leads need be carried through the connecting cable 88.

I claim:

1. The method of electrically interconnecting a plurality of lighting fixtures in succession, which consists in;

extending first, second, and third circuit leads from a power source to the first fixture, through each fixture, and between successive fixtures     connecting all fixture lamps across those portions of the first and third circuit leads extending through the fixtures,     connecting the first and second circuit leads to one side of the power source and the third circuit lead to the other side thereof,     detachably connecting at least one end of said circuit lead portions extending between said fixtures to one end of those portions thereof extending through said fixtures, and in     cross-connecting one end of those portions of said first and second circuit lead portions extending between two of said fixtures to one end of those portions thereof extending through one of the said two fixtures so that lamps of fixtures lying between the point of cross-connection and the power source are connected across a first circuit formed by said first and third circuit leads and the lamps of fixtures lying beyond the point of cross-connection are connected across a circuit formed by the second and third circuit leads.

2. The method claimed in claim 1 which further includes connecting one end of those portions of said circuit leads extending through said fixtures to a fixture-mounted receptacle, and in connecting one end of those portions of said circuit leads extending between said fixtures to a plug-in connector reversibly enterable into said receptacle.

3. The method claimed in claim 1 which further includes selectively switching those portions of said first and second circuit leads extending between said power source and the first fixture.

4. The method claimed in claim 1 which further includes selectively switching those portions of said first or second circuit leads extending between said fixtures.

5. An electrical interconnect system for multiple lighting fixtures, comprising;
 a power source,
 a plurality of lighting fixtures each having one or more lamps,
 first, second, and third circuit leads extending from said power source to a first fixture, through each fixture, and between successive fixtures,
 internal connections connecting said fixture lamps across those portions of said first and third circuit leads extending through said fixtures,
 means connecting said first and second circuit leads to one side of said power source and said third lead to the other side thereof,
 said portions of said first and second circuit leads extending between two of said fixtures being cross-connected with said portions of said first and second circuit leads extending through one of the said two fixtures so that the lamps in succeeding fixtures are connected to said power source through said second and third circuit leads,
 a flexible conduit extending between and connected to adjacent fixtures and enclosing those portions of said three circuit leads extending between said fixtures,
 means for detachably connecting at least one end of said conduits to said fixtures and for detachably connecting at least one end of said circuit lead portions extending between said fixtures to those portions thereof extending through said fixtures, comprising,
 a receptacle mounted in each fixture having terminals connected to an end of said circuit lead portions extending through said fixture and a cooperating plug-in connector connected to an end of each flexible conduit and having terminals connected to an end of said circuit lead portions extending between said fixtures.

6. The electrical interconnect system claimed in claim 5 which further includes means for independently switching said first and second circuit leads at a point between said power source and said first fixture.

7. An electrical interconnect system for multiple lighting fixtures, comprising;
 a power source,
 a plurality of lighting fixtures each having one or more lamps,
 first, second, and third circuit leads extending from said power source to a first fixture through each fixture and between successive fixtures,
 internal circuit connections connecting said fixture lamps across those portions of said first and third circuit leads extending through said fixtures,
 means connecting said first and second circuit leads to one side of said power source and said third lead to the other side thereof,
 a flexible conduit extending between and connected to adjacent fixtures and enclosing those portions of said three circuit leads extending between said fixtures,
 means for detachably connecting at least one end of said conduits to said fixtures and for detachably connecting at least one end of said circuit lead portions extending through said fixtures to those portions extending between said fixtures, comprising,
 a receptacle mounted in each fixture and a cooperating plug-in connector on an end of each conduit, said plug-in connectors being reversibly enterable into said receptacles, and
 said first and second circuit lead portions extending through and between said fixtures being connected to terminals in said receptacles and in said plug-in connectors, respectively, in such order as to be straight through connected when said plug-in connector is entered into a receptacle in one position and cross-connected when entered in a reverse position.

8. The electrical interconnect system claimed in claim 1 which further includes a flexible conduit extending between said power source and a first fixture enclosing said circuit leads, and having a reversible plug-in connector on at least one end thereof reversibly enterable into a receptacle mounted in said first fixture.

9. The electrical interconnect system claimed in claim 1 which further includes means for independently switching said first and second circuit leads at a point between said power source and a first lighting fixture.

10. The electrical interconnect system claimed in claim 1 which further includes means for independently switching said first or second circuit leads at a point between two lighting fixtures.

* * * * *